United States Patent [19]

Jordan et al.

[11] 4,245,657
[45] Jan. 20, 1981

[54] METHOD AND APPARATUS FOR LOADING BULK TOBACCO BARNS

[75] Inventors: Bertram L. Jordan; John D. Mitchell, both of Lewiston, N.C.

[73] Assignee: Harrington Manufacturing Company, Lewiston, N.C.

[21] Appl. No.: 805,487

[22] Filed: Jun. 10, 1977

Related U.S. Application Data

[63] Continuation of Ser. No. 642,624, Dec. 19, 1975, abandoned.

[51] Int. Cl.³ .......................... A24B 1/02; B60P 1/48; B62B 1/06
[52] U.S. Cl. ...................... 131/138; 254/9 C; 254/10 C; 414/452; 414/917; 432/500
[58] Field of Search .................. 131/133–136, 131/138, 139, 140; 432/500; 254/10 C, 10 R, 9 R, 9 B, 9 C; 214/512–514; 414/452, 917

[56] References Cited

U.S. PATENT DOCUMENTS

| 368,883 | 8/1887 | Forbes | 414/917 |
|---|---|---|---|
| 410,157 | 9/1889 | De Weese | 254/9 C |
| 568,071 | 9/1896 | Rasch | 188/43 |
| 2,293,316 | 8/1942 | Stebbins | 432/500 |
| 2,840,346 | 6/1958 | Du Moulin | 254/10 C |
| 3,935,648 | 12/1976 | Cox | 131/133 R |

*Primary Examiner*—V. Millin

[57] ABSTRACT

Method and apparatus for loading and unloading a bulk curing tobacco barn so that large heavy containers filled with tobacco leaves will be properly positioned in the barn in a close front-to-back relationship.

2 Claims, 7 Drawing Figures

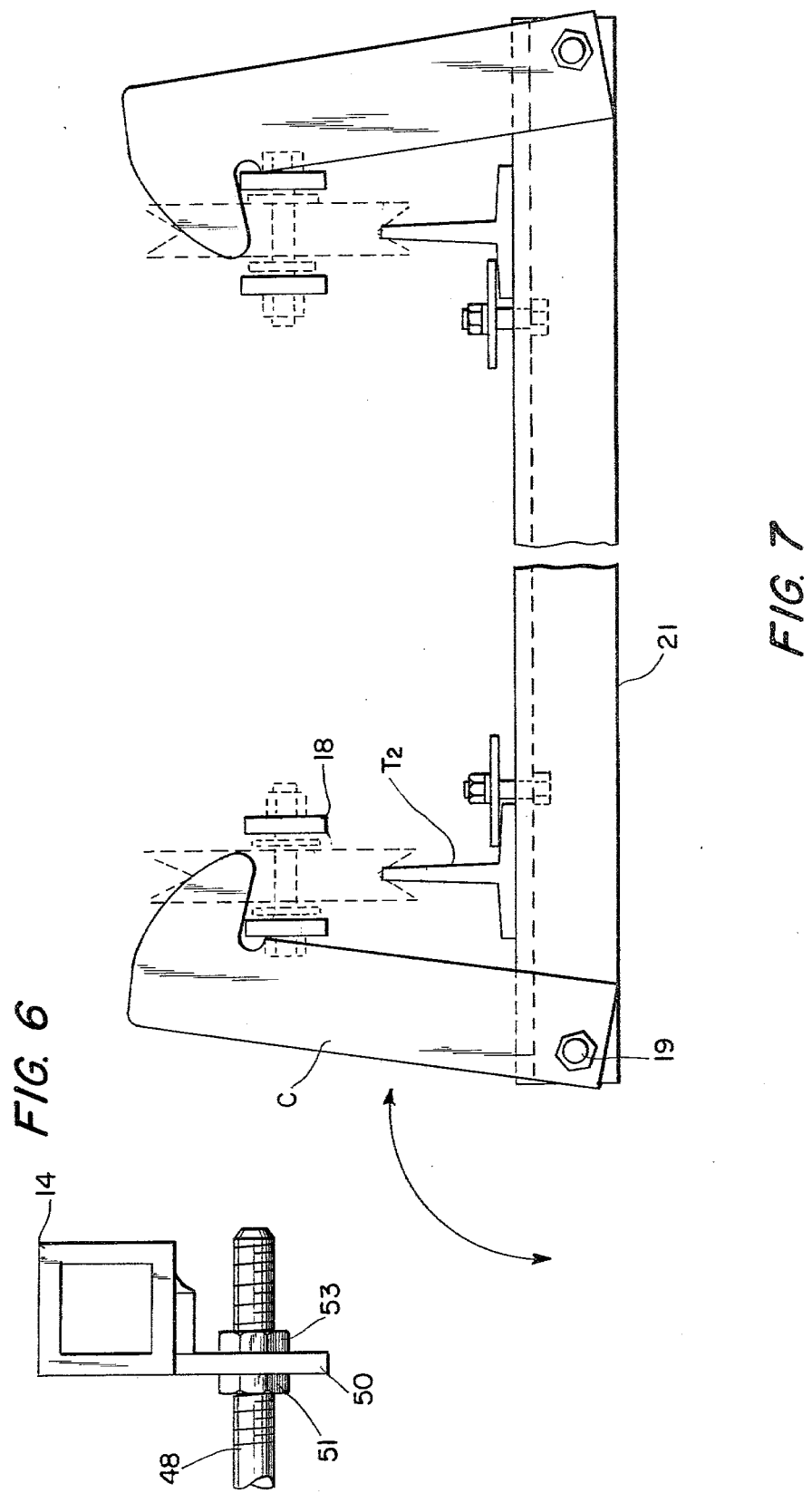

METHOD AND APPARATUS FOR LOADING BULK TOBACCO BARNS

This is a continuation of application Ser. No. 642,624, filed Dec. 19, 1975, now abandoned.

BACKGROUND

The present status of the tobacco industry in the United States has been that because of the decreasing availability of labor and the increasing cost of what labor is available, every effort is being made to use machines and mechanical devices as much as possible in the harvesting and curing of tobacco, and to minimize as much as possible the necessity for manual labor. For instance, thirty years ago nearly all tobacco was cured by tying bunches of leaves on sticks and carefully arranging each of those sticks at spaced apart positions in a curing barn. About ten years ago farmers started using the system of arranging a mass of tobacco leaves in small bulk racks and then loading about 125 of these small racks into a curing barn. The natural evolution of this bulk concept has been to deposit green tobacco leaves in ever larger bulk containers, and now very large containers are filled with green tobacco leaves and the loaded container, weighing 1500–2000 lbs, is hoisted into a barn for curing. It has been found that eighteen such large containers in a curing barn can take the place of one hundred twenty-six of the smaller types of racks that were previously used, thereby eliminating much of the manual manipulation that was heretofore associated with the smaller racks. Large containers are filled by simply dumping leaves in the container in a rather indiscriminate manner and once such containers are filled with a mass of leaves they can be moved into and out of a curing barn by mechanical lifting devices which greatly reduce the manual effort required.

The bulk curing of tobacco is now widely practiced by tobacco farmers. A number of manufacturers offer bulk curing equipment, including bulk curing barns and bulk curing racks. Thus, the combination of components which are already generally known in the art includes:

(a) a bulk curing barn having sides, a floor and a roof,
(b) access means in one side of said barn, said access means being large enough to accommodate the introduction of a box-like tobacco leaf container, said access means being closeable during the bulk curing operation,
(c) a stationary support means located on the interior of said barn, said stationary support means being adapted to support a plurality of containers within said barn in front-to-back relationship, and
(d) means for passing air through the leaves in each container under controlled conditions of time, temperature, humidity and pressure to effect curing of the leaves.

The combination of method steps which is already generally known in the art include (a) removing tobacco leaves from a tobacco stalk while the plants are in the field,
(b) depositing said removed leaves into a large container that is designed to be placed into a bulk curing barn,
(c) transporting said large container from the tobacco field to a position in the vicinity of a bulk curing barn by means of a vehicle,
(d) generally fixing the position of a majority of the leaves within said container before or after step (c) by forcing a plurality of elongated spike members through the mass of green tobacco leaves within said container and maintaining the position of said spike members substantially stationary with respect to said container during subsequent loading and curing steps,
(e) transferring a plurality of such loaded containers from a position outside the bulk curing barn to a stationary supported position within said bulk curing barn in a side-by-side positional relationship wherein at least the bottom side and top side of each container are provided with sufficient openings to permit the passage of heated gases through the mass of tobacco leaves contained therein, and
(f) moving gas under controlled conditions of temperature humidity and pressure through the mass of leaves in the containers for a sufficient time to cure the leaves.

Some patents which are of interest relative to bulk curing include U.S. Pat. Nos. 3,105,713; 3,110,326; 3,251,620; 3,659,889; 3,088,603 and 3,834,137. The disclosures of these references are incorporated herein by reference for their showings of the apparatus and methods which are already known in the art.

A considerable amount of work on curing in large bulk containers has also been carried out at the North Carolina State University at Raleigh, N.C. by Dr. Charles Suggs. This work is not secret and has been viewed by interested farmers and manufacturers.

PROBLEM

One problem with the trend toward using larger and larger containers for the tobacco leaves is that they are so heavy and bulky (1500–2000 lbs) that the mechanical means (e.g. hoists, cranes and fork lifts) needed to move such containers are expensive, bulky and subject to various mechanical problems. Also, if these large heavy containers full of green leaves are not aligned in a close front-to-back relationship when they are placed in a curing barn, the heated air used for curing will move through the "channels" that are formed between containers rather than through the leaves in the containers. Imperfect curing will result.

THE PRESENT INVENTION

The present invention pertains to an improved method and apparatus for loading and unloading a bulk curing barn so that large heavy containers filled with tobacco leaves will be properly positioned in the barn in a tight front-to-back relationship.

Considered from one aspect, the improvement in apparatus that we have developed over what is known comprises the combination of (1) a main track means adjacent the bottom of said barn, said track means extending from one end of said barn to the other,
(2) a secondary track means forming an extension of said maintrack means and extending outwardly from the interior of said bulk barn through said access means,
(3) a movable container support on said track means and adapted to carry the weight of a loaded container of tobacco leaves, said movable container support having wheels on its underside upon which to move back and forth over at least a substantial portion of the length of said main and secondary track means, (4) said movable container support including a platform and means to swing said platform from a upper position through a downward arc to a lower position, the upper position of said platform being at a level above said stationary container support means and the lower position of said platform being at a level below said stationary container support means.

Considered from one aspect, the improvement which our method involves over the method that is already known in the art includes the steps of:

(1) transferring each loaded container of green tobacco leaves from a position outside said bulk curing barn to a position inside said bulk curing barn by supporting it upon a vertically adjustable platform that rolls on trackways that extend for substantially the full interior length of the floor of the bulk curing barn and for a substantial distance outside the barn, (2) adjusting the vertical height of said platform so that as it carries a container full of leaves into the bulk curing barn, the container will not engage the stationary supports in the curing barn that are designed to support the container during the curing operation, (3) causing said platform to move through a downward and forward arc once said container has arrived at approximately its desired position within the bulk curing barn so that not only is the weight of the container transferred to the stationary support members within the bulk barn but the container is wedged forward tightly against either the back wall of the barn or against the adjacent container, (4) withdrawing said platform member from said bulk curing barn along said trackway after it has been adjusted downwardly to such an extent that it is no longer supporting said container, (5) repeating steps (1) through (4) until the bulk curing barn is filled with loaded containers positioned in a close front-to-back relationship, (6) curing the leaves in the containers, and (7) subsequent to the curing operation using the vertically adjustable platform in a reverse manner to that set forth in steps (1)–(5) to thus remove all of the containers containing cured tobacco leaves.

Considered from another aspect, the present invention involves a device for facilitating the movement of a large container full of tobacco leaves from a first position outside a tobacco barn to a second position inside a barn comprising in combination (a) a lower frame member (b) a plurality of wheels mounted at spaced apart points on said lower frame member so as to permit said lower frame member to move back and forth along a track means, (c) an upper frame member disposed above said lower frame member, (d) a plurality of linkage members linking said lower frame member to said upper frame member, each of said linkage members having one end pivotally mounted on said lower frame member and the other end pivotally mounted on said upper frame member, and (e) means for lowering said upper frame member from an upper position with respect to said lower frame member through a downward arc to a lower position with respect to said lower frame member, said means also permitting raising of said upper frame member to its original position.

THE INVENTION IN DETAIL

Our invention will be more readily understood by reference to the attached drawings, wherein:

FIG. 6 is a fragmentary sectional view showing how the rod 48 can be varied in effective length; and FIG. 7 is a fragmentary section view showing details of the clamping member.

Figure 1:
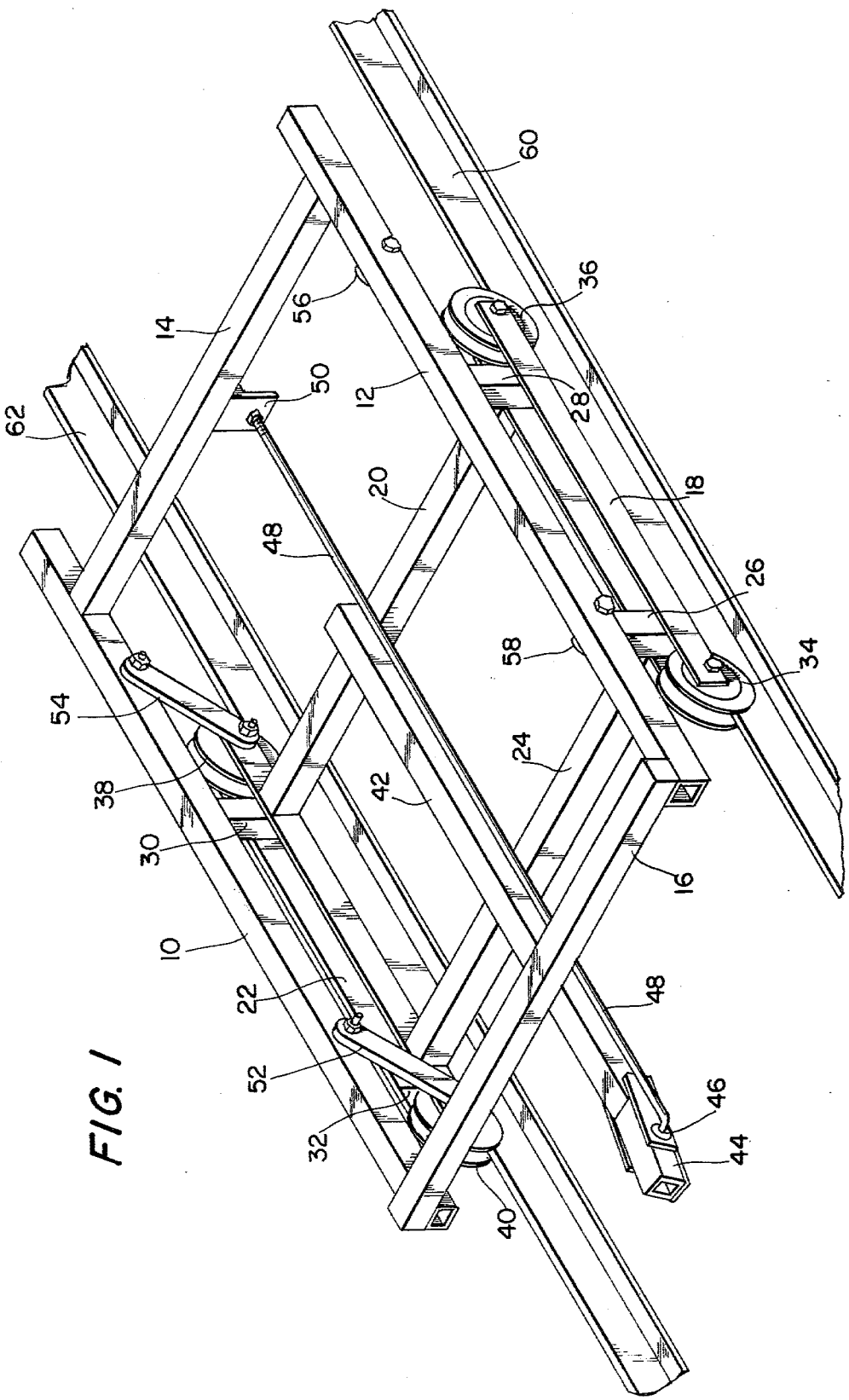
FIG. 1 is a perspective view of a box transport device in accordance with this invention.

Referring now to the drawings, and particularly FIG. 1, it will be seen that our invention first of all involves a lower frame member that includes a generally rectangular arrangement of two elongated side members 18 and 22 and two transverse members 20 and 24 that interconnect the side members 18 and 22 at spaced apart points. The side member 18 is provided adjacent its ends with wheels 34 and 36 and the side member 22 is similarly provided near its ends with wheels 38 and 40. The wheels 34, 36, 38 and 40 permit the lower frame member to move back and forth along tracks 60, 62.

The drawings also show an upper frame member disposed above said lower frame member, said upper frame member comprising a generally rectangular arrangement of interconnected elongated members 10, 12, 14 and 16.

Linkage members 52 and 54 interconnect side members 22 and 10 of the lower and upper frame members respectively. Similar linkage members 56 and 58 interconnect the side member 18 of the lower frame member with the side member 12 of the upper frame member. The linkage members are pivotally connected to both the upper and lower frame members so that the upper and lower frame members can move toward or away from each other a limited distance.

The mechanism for causing the upper and lower frame members to move closer to each other or away from each other can take a number of different forms, but a preferred mechanism that is shown in the drawings consists of a rod linkage system. In particular, an elongated rod 48 is disposed approximately centrally between the tracks 60 and 62 and between the upper and lower frame members. One end of the rod 48 is threaded and is secured to an anchor member 50 located on cross bar 14 by means of nuts on both sides of the anchor member 50. The other end of rod 48 is pivotally attached to an over-center toggle member 44 that is in turn pivotally mounted on the end of the elongated member 42 by pin 43. Elongated member 42 is welded or otherwise fastened to the cross members 20 and 24 of the lower frame member.

Figure 4:
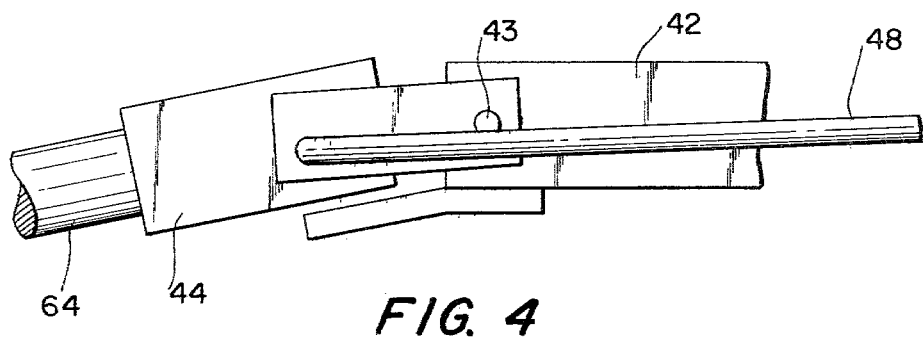
FIGS. 4 and 5 are fragmentary side views showing alternate positions of the "over-center" toggle arrangement.
Figure 5:
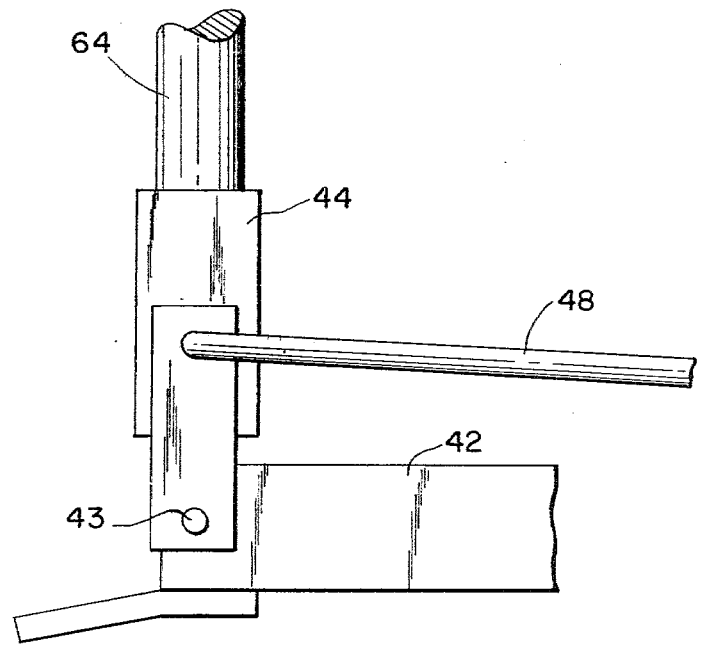

FIG. 4 is an enlarged fragmentary side view showing the rod 48 in its "down" position (where the upper frame member will be in its "raised" position) and FIG. 5 is a similar view showing the rod 48 in its "up" position (where the upper frame will be in its "lowered" position).

A plurality of substantially vertical posts (26, 28, 30 and 32) are anchored to the lower frame member and function to limit the downwardmost position of the upper frame member.

FIG. 6 shows how that effective length of rod 48 may be varied by adjustment of the relative position of the nuts 51 and 53 with respect to the threaded end of the rod 48 and anchor member 50. By varying the effective length of the rod 48 it is possible to vary the maximum height of the upper frame member above the lower frame member.

Figure 2:
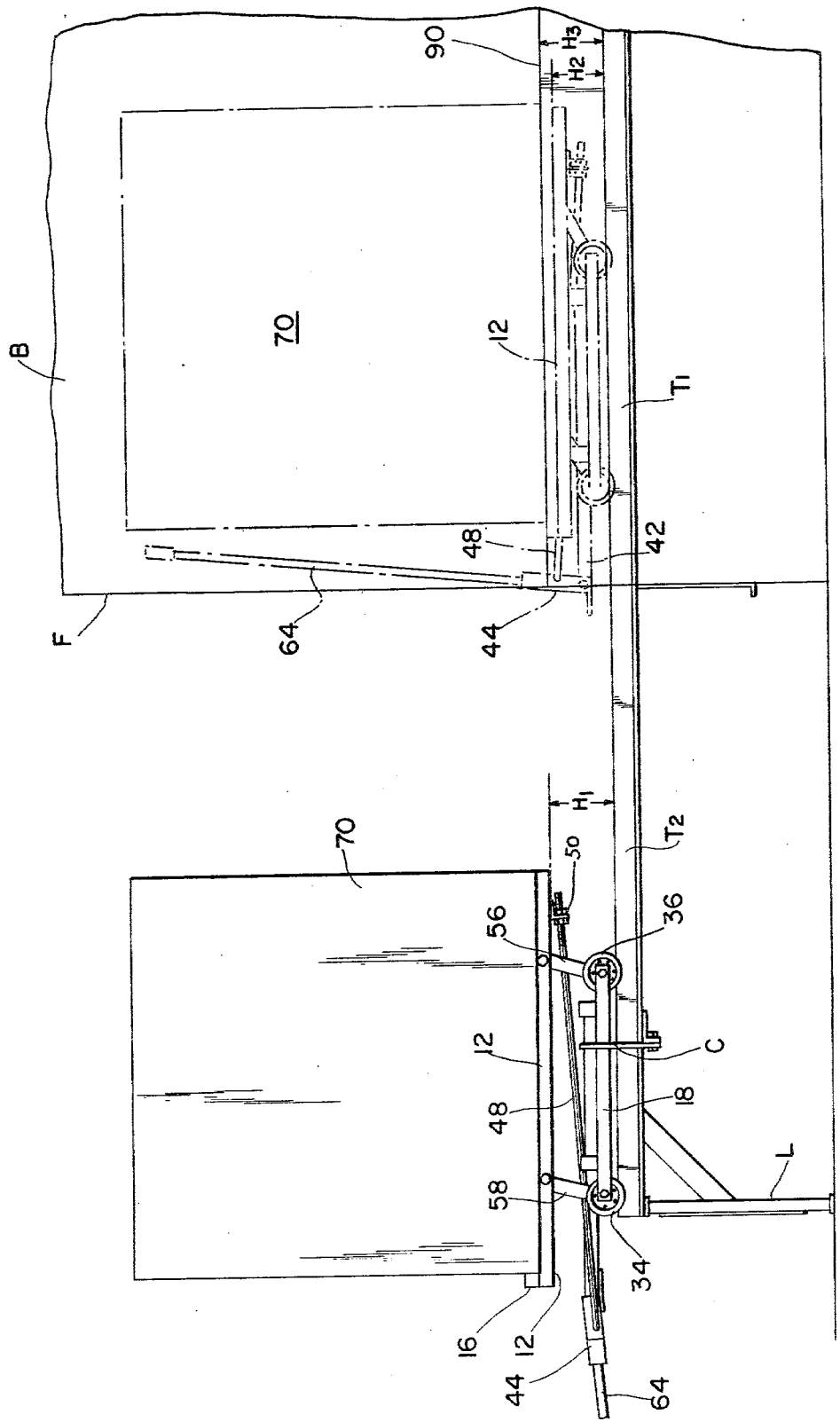
FIG. 2 is a side view, partially in phantom, showing how the box transport device of this invention changes from an elevated position outside the barn to a lowered position within the barn.
Figure 3:
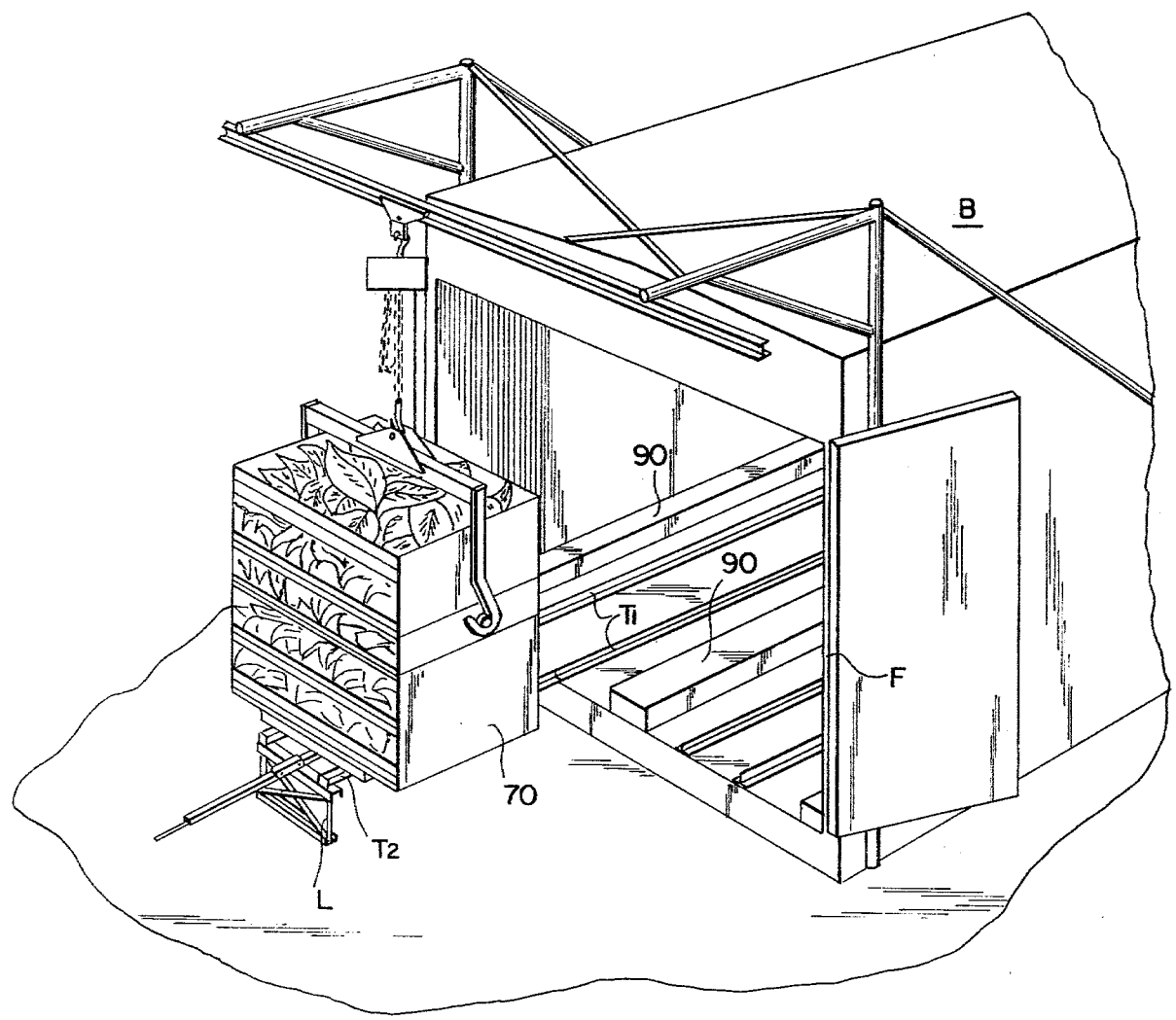
FIG. 3 is a perspective view of a box full of tobacco leaves being loaded upon a transport device.

FIG. 3 shows how a worker uses a hoist device to deposit the container 70 on the transport device of our invention. Once the container 70 full of tobacco leaves is placed on our transport device then the next step is to move the transport device into a curing barn. In FIG. 2 the two positions of the box transporting device of this invention are illustrated. In this figure it will be seen that a barn is generally indicated at B having a front opening F and a trackway $T_1$ within the barn. A track $T_2$ is located exteriorly of the front entrance F of the barn B, which trackway is in alignment with the trackway $T_1$ within the barn. The exterior trackway $T_2$ is supported at its inner end by the barn itself and at the outer end by a leg L.

When a filled tobacco container 70 arrives from the field it is placed upon the top of the upper frame member as is indicated in FIG. 3 and the left portion of FIG. 2. It will be seen that in the left portion of FIG. 2 the upper frame member is in its highest position. This high position is achieved because the rod 48 has been caused to be extended to the left of the "over-center" position (see FIG. 4) by moving the handle 64 to its most counter-clockwise position. In other words, when the handle 64 is in the position shown in FIG. 4 and in the left portion of FIG. 2 the rod 48 locks the upper frame member in its uppermost position. In this position the box 70 is maintained at a height $H_1$ above the track $T_2$.

While the container full of tobacco leaves is initially being placed on our novel transport device, the lower frame member should be clamped to the track $T_2$ by means of a clamp C. This will insure that the transporting device does not tip, slide, or otherwise move during the time that the box 70 is being deposited thereon. In FIG. 7 the clamp member C is shown as being pivotable about bolt 19 which can be tightened with a nut (not shown) to fix the clamp in any desired position. Once the box 70 is securely in the desired position, as shown in the left portion of FIG. 2, the clamp member C may be loosened and swung out of the way so that all that a worker then needs to do is to push the transport member to the right so that the wheels will roll down the trackway $T_2$, through the front door F of the barn, and onto the trackway $T_1$ located within the barn.

Also located within the barn are two ledge members 90 disposed a distance of $H_3$ above the trackway $T_1$. These ledge members 90 are adapted to support the loaded boxes 70 at a spaced distance above the perforated floor of the curing barn. The floor of the barn is beneath the tracks $T_1$. The distance $H_3$ is less then the distance $H_1$ so that when the box 70 is first moved into the barn, the bottom of box 70 will initially be above the ledge 90. When our novel transport device and the loaded box which it supports have progressed into the barn as far as hand pushing will take it, then the worker will move the handle 64 from the position shown in the left portion of FIG. 2 (and FIG. 4) to the position shown in the right portion of FIG. 2 (and FIG. 5). Movement of the handle 64 from the position of FIG. 4 to that of FIG. 5 causes the rod 48 to go "over-center" and the upper frame member will tend to move through a downward arc toward said lower frame member. As the upper frame member moves downwardly, a point will be reached where the bottom of the container 70 will engage the spaced apart ledge members 90. The box 70 will then rest on the ledge members 90 and as the upper frame member continues downwardly it will end up at a position below the ledge member 90 at a level $H_2$. When the upper frame reaches position $H_2$ none of the weight of the box 70 will be supported by the upper frame member. Our box transporting device can then simply be rolled back out of the barn where it can then be used to load another box in the manner described.

Our novel transporting device is relatively inexpensive compared to fork lifts, cranes or cable hoist arrangements. More importantly our transporting device has the unique advantage that it imparts a forward force or forward thrust to the loaded container simultaneously with the lowering of the container. This forward force or forward thrust helps to insure that the loaded container will be jammed closely together in the bulk curing barn and minimizes the possibility that gaps or channels will be left between adjacent containers.

When the curing operation in the barn has been completed our box transport device can be used to remove from the barn the containers 70 that now contain cured leaves. To accomplish this our transport devices are rolled into the barn in their lowered position (FIG. 5) and, when in the proper position beneath a container, is raised by lowering the handle 64 (FIG. 4). The upper frame member thereby rises and lifts the container 70 above the ledge 90. The transport device is then rolled out of the barn carrying the container 70.

A preferred container for use in connection with our invention is one which is 64 inches high, 57 inches wide and 36 inches deep, having knobs on the sides which facilitate handling and lifting. When filled the container has a plurality of prongs extending through the container in the manner already known for such containers.

What we claim is:

1. In the known method of harvesting and curing tobacco leaves in a bulk curing barn which comprises:
    (a) removing tobacco leaves from a tobacco stalk while the plants are in the field,
    (b) depositing said removed leaves into a container that is designed to be placed into a bulk curing barn,
    (c) transporting said container from the tobacco field to a position in the vicinity of a bulk curing barn by means of a vehicle,
    (d) generally fixing the position of a majority of the leaves within said container before or after step (c) by forcing a plurality of elongated spike members through the mass of green tobacco leaves within said container and maintaining the position of said spike members substantially stationary with respect to said container during subsequent loading and curing steps,
    (e) transferring a plurality of such loaded containers from a position outside the bulk curing barn to a stationary supported position within said bulk curing barn in a front-to-back positional relationship wherein at least the bottom side and top side of each container are provided with sufficient openings to permit the passage of heated gases through the mass of tobacco leaves contained therein, and (f) moving gas under controlled conditions of temperature humidity and pressure through the mass of leaves in the containers for a sufficient time to cure the leaves, the improvement which comprises:

(1) transferring each loaded container from a position outside said bulk curing barn to a position inside said bulk curing barn by supporting it upon a vertically adjustable platform that rolls on trackways that extend for substantially the full interior length of the floor of the bulk curing barn and for a substantial distance outside the barn, (2) adjusting the vertical height of said platform so that as it carries a container full of leaves into the bulk curing barn the container will not engage the stationary supports in the curing barn that are designed to support the container during the curing operation, (3) lowering said platform with a forward component of force once said container has arrived at approximately its desired position within the bulk curing barn so that not only is the weight of the container transferred to the stationary support members within the bulk barn but the container is wedged forward tightly against either the end wall of the barn or against an adjacent container, (4) withdrawing said platform member from said bulk curing barn back along said trackway after it has been adjusted downwardly to such an extent that it is no longer supporting said container, (5) repeating steps (1) through (4) until the bulk curing barn is filled with loaded containers positioned in a close front-to-back relationship, (6) curing the leaves in the containers, and (7) subsequent to the curing operation using the vertically adjustable platform in a reverse manner to that set forth in steps (1)–(5) to thus remove all of the containers containing cured tobacco leaves.

2. An method according to claim 1 which includes means for temporarily clamping said movable container support to said secondary track means.

* * * * *